(12) United States Patent
Monti

(10) Patent No.: US 10,377,580 B2
(45) Date of Patent: Aug. 13, 2019

(54) APPARATUS FOR DISPLACING ARTICLES CONTINUOUSLY ADVANCING ALONG AN ADVANCEMENT DIRECTION

(71) Applicant: MARCHESINI GROUP S.P.A., Pianoro (Bologna) (IT)

(72) Inventor: Giuseppe Monti, Pianoro (IT)

(73) Assignee: MARCHESINI GROUP S.P.A., Pianoro (Bologna) (IT)

(*) Notice: Subject to any disclaimer, the term of this patent is extended or adjusted under 35 U.S.C. 154(b) by 0 days.

(21) Appl. No.: 16/070,944

(22) PCT Filed: Feb. 24, 2017

(86) PCT No.: PCT/IB2017/051093
§ 371 (c)(1),
(2) Date: Jul. 18, 2018

(87) PCT Pub. No.: WO2017/149424
PCT Pub. Date: Sep. 8, 2017

(65) Prior Publication Data
US 2019/0055094 A1    Feb. 21, 2019

(30) Foreign Application Priority Data
Feb. 29, 2016 (IT) .......................... 102016000020643

(51) Int. Cl.
*B65G 47/34* (2006.01)
*B65B 35/20* (2006.01)
(Continued)

(52) U.S. Cl.
CPC .......... *B65G 47/845* (2013.01); *B65B 35/205* (2013.01); *B65B 35/405* (2013.01); *B65B 57/005* (2013.01)

(58) Field of Classification Search
CPC ...... B65G 47/845; B65B 35/205; B65B 57/05
(Continued)

(56) References Cited

U.S. PATENT DOCUMENTS 3,731,782 A * 5/1973 Del Rosso ........... B65G 17/005
198/350
4,553,659 A * 11/1985 Reim .................... B65B 35/205
198/370.07
(Continued)

FOREIGN PATENT DOCUMENTS

EP        0765810 A1    4/1997
EP        1020380 A1    7/2000
(Continued)

*Primary Examiner* — Douglas A Hess
(74) *Attorney, Agent, or Firm* — R. Neil Sudol; Henry D. Coleman

(57) ABSTRACT

Apparatus includes a conveyor and pusher elements, mounted on carriages predisposed slidably on support rods fixed transversely to belts of the conveyor to displace the articles transversely to an advancement direction thereof. Idler rollers are below the carriages. First and second sliding pathways, alternating in sliding the rollers, are of such a shape that when the rollers pass along the first sliding pathway, the carriages maintain a stationary position on the support rods and when the rollers pass along the second sliding pathway, the carriages translate along the support rods so that the pusher elements translate transversely to displace and push the articles transversely. A switching device abuts the rollers and deviates them so that the rollers can be inserted and slide in either the first or the second sliding pathway.

4 Claims, 6 Drawing Sheets

(51) Int. Cl.
*B65G 47/84* (2006.01)
*B65B 35/40* (2006.01)
*B65B 57/00* (2006.01)

(58) Field of Classification Search
USPC ................ 198/370.02, 370.03, 370.07, 597
See application file for complete search history.

(56) References Cited

U.S. PATENT DOCUMENTS

| | | | |
|---|---|---|---|
| 4,738,083 A | 4/1988 | Kawai et al. | |
| 5,613,591 A * | 3/1997 | Heit .................... | B65G 47/844 198/370.02 |
| 6,615,972 B2 * | 9/2003 | Veit ..................... | B65G 47/844 198/370.02 |
| 6,923,308 B2 * | 8/2005 | Veit ..................... | B65G 47/844 198/370.02 |
| 6,951,274 B2 * | 10/2005 | Zeitler .................. | B65G 47/52 198/370.02 |
| 7,410,045 B2 * | 8/2008 | Patterson ............. | B65G 47/845 198/370.07 |
| 7,516,835 B2 * | 4/2009 | Neiser .................. | B65G 47/844 198/370.02 |
| 7,690,496 B1 * | 4/2010 | Fye ...................... | B65G 17/005 198/370.02 |
| 9,290,331 B2 * | 3/2016 | Fye ...................... | B65G 47/52 |
| 9,457,961 B2 * | 10/2016 | Green, III ........... | B65G 47/844 |
| 2008/0000753 A1 | 1/2008 | Patterson et al. | |
| 2008/0209867 A1 | 9/2008 | Lidington | |

FOREIGN PATENT DOCUMENTS

| | | |
|---|---|---|
| WO | WO 01/47776 A1 | 7/2001 |
| WO | WO 2015/193758 A1 | 12/2015 |

\* cited by examiner

APPARATUS FOR DISPLACING ARTICLES CONTINUOUSLY ADVANCING ALONG AN ADVANCEMENT DIRECTION

FIELD OF THE INVENTION

The present invention relates to the technical sector relative to automatic packaging of articles internally of relative containers.

In particular, the present invention relates to an apparatus for carrying out insertion of articles internally of relative containers, while the articles and the relative containers are continuously advancing according to two parallel directions, one flanked to another.

The apparatus made available by the present invention is therefore planned and designed so as to displace and push the articles, which are continuously advancing along an advancement direction, transversally to the advancement direction thereof, and to insert the containers which in turn are continuously advancing by the flank of the articles.

In this particular situation, therefore, the problem to be overcome is that of being able to carry out the transversal displacement of the articles so as to push them and insert them internally of the relative containers while both the articles and the containers are continuously advancing, transported by the relative conveyors.

DESCRIPTION OF THE PRIOR ART

The apparatus disclosed by the present invention is particularly applicable in automatic machines which have to carry out the inserting of blister packs internally of the relative boxes, in which the boxes are arranged on a conveyor which continuously advances, while the blister packs are in turn arranged on a relative conveyor which also advances continuously, flanked to the conveyor of the boxes, and activated in synchrony therewith, so that the blister packs are transported facing the boxes, and advanced at the same advancement velocity as the boxes.

A known apparatus, used for displacing articles that are continuously advancing on a conveyor along an advancement direction, such as for example blister packs which are to be displaced and inserted in relative boxes, is described in patent application WO2015/193758, in the name of the same Applicant.

The apparatus comprises a loop-wound conveyor organ, which is positioned by the flank of the article conveyor, and a series of pusher elements, which are mounted on the conveyor organ so as to displace the articles, transversally to the advancement direction thereof, and insert them in relative containers.

The loop-wound conveyor organ comprises a pair of belts which are wound in a closed loop on relative activating pulleys, and a series of rods which are arranged and fixed transversally between the pair of belts.

The loop-wound conveyor is predisposed in such a way that a relative straight conveying branch of the pair of belts, for example the upper branch, is situated at a level corresponding to the level of the conveyor of the articles.

In the apparatus each pusher element of the pusher elements is borne by a relative carriage that is mounted, slidably, on a relative rod of the rods fixed to the pair of belts of the conveyor organ.

The conveyor organ is activated in synchrony with the conveyor of the articles so that when the pusher elements move along the above-mentioned straight conveying branch of the pair of belts, they advance with an advancement direction parallel to the advancement direction of the articles and with the same advancement velocity of the articles so as to be opposite the articles.

The apparatus further comprises movement means that are predisposed to be able to move the pusher elements when they are advancing along the straight conveying branch, transversally to the advancement direction thereof, towards the conveyor of the articles and towards the conveyor of the containers so that the pusher elements can abut and thus push the articles so as to displace them transversally from the transporter thereof internally of the containers, while they are continuously advancing.

The movement means comprise rollers which are mounted idle below the carriages that bear the pusher elements, and also comprise sliding pathways that are associated to the conveyor organ and which have a shape such that the rollers can slide internally thereof.

In particular, the movement means comprise a first sliding pathway and a second sliding pathway alternative to one another for the sliding of the rollers of the carriages.

The first sliding pathway is designed and predisposed so that when it is passed along by the rollers of the carriages, the carriages maintain a stationary position with respect to the relative rods during the activating of the belts, and therefore the pusher elements borne by the carriages are made non-operative, i.e. they are maintained in a retracted position with respect to the articles while they move along the straight conveying branch, and therefore the articles are not pushed transversally towards the conveyor of the boxes.

This situation can result when, for example, there is a container missing from the conveyor of the containers and therefore the article that should have been inserted in the missing container must not be displaced towards the conveyor of the containers; or, this might happen even in a case in which an article is missing and therefore there is no need to displace the pusher element.

Instead, the second sliding pathway is predisposed so as to have a curved profile and extends in such a way that when it is passed along by the rollers of the carriages, the carriages are forced:

to slide and translate along the relative support rods transversally to the conveyor towards the conveyors of the articles and the containers in such a way that the relative pusher elements borne thereby are also translated transversally above the conveyor of the articles in order to abut a relative article and push it into a relative container.

and, thereafter, to perform a second translation in an opposite direction, distancing itself from the conveyors of the containers and the articles in order to be repositioned in the retracted position.

The apparatus further comprises, immediately upstream of the start of the straight conveying branch of the conveyor organ, a suitable switching device for abutting the rollers of the carriages which bear the pusher elements and deviate the rollers (and therefore the carriages which bear the pusher elements) so that they are deviated to pass along the second sliding pathway, as a consequence of suitable signals received by sensor organs provided so as to detect the presence of the articles and the containers on the relative conveyors.

In the known apparatus described in the above-mentioned patent application, the switching device for deviating the rollers of the carriages so as to direct them and make them pass along the first or the second sliding pathway has a quite complex structure.

This apparatus has shown itself to be effective and valid for advancement velocities of the articles and of the relative boxes, along the respective conveyors that are not very high.

However, in a case of very fast operating velocities, i.e. in the case of very high advancement velocities of the articles and the relative boxes along the respective conveyors, this apparatus has shown itself to be not entirely effective in carrying out the exchanging operations of the carriages from the first to the second sliding pathway with an exchange frequency that is sufficiently high to guarantee that all the articles are effectively correctly pushed and inserted in corresponding boxes.

In fact, when the conveyors of the articles and containers are activated with very high advancement velocities, correspondingly also the belts of the conveyor organ of the pusher elements have to be activated at high velocities in order to be able to guarantee the synchrony of advancement between the pusher elements and the articles.

Consequently, the frequency with which the switching device has to be made operative is very high and it has been found that at times the deviation of the carriages towards the second sliding pathway does not occur with good timing, and therefore there are some cases of non-insertion of articles in relative containers.

SUMMARY OF THE INVENTION

The aim of the present invention is therefore to provide an improved apparatus for displacing the articles which advance continuously along an advancement direction able to obviate the above-mentioned drawbacks.

A particular aim of the present invention is to provide an apparatus able to effectively carry out the transversal displacement of articles which continuously advance along an advancement direction for insertion thereof into containers, also continuously advancing, including when both the articles and the relative containers advance along the respective conveyors with a very high velocity so as always and in any case to guarantee a correct insertion of the articles in the containers.

The above-mentioned aims are obtained by an apparatus for continuously displacing articles advancing along an advancement direction according to the contents of claim 1.

Further advantageous characteristics of the apparatus of the present invention are set down in the various dependent claims.

BRIEF DESCRIPTION OF THE DRAWINGS

The characteristics of a preferred, but not exclusive, embodiment of the apparatus for displacing articles continuously advancing along an advancement direction of the present invention are described in the following with reference to the appended tables of drawings, in which.

DESCRIPTION OF THE PREFERRED EMBODIMENTS

Figure 1:
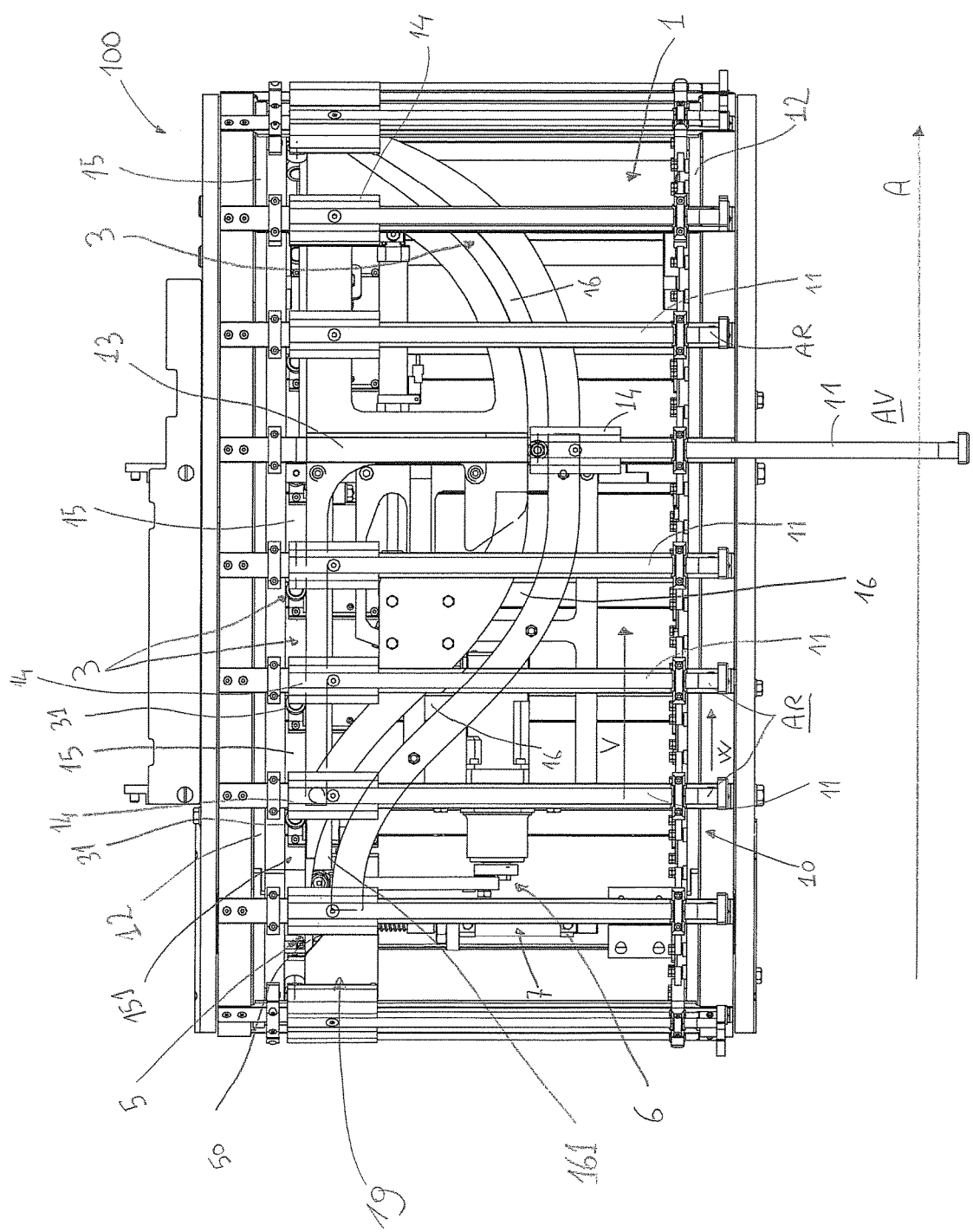
FIG. 1 is a schematic view from above of the apparatus for displacing articles continuously advancing along an advancement direction proposed by the present invention, represented in a particular operating step; in this figure the advancement direction along which the articles continuously advance has been generically denoted by the arrow denoted by reference A.
Figure 2:
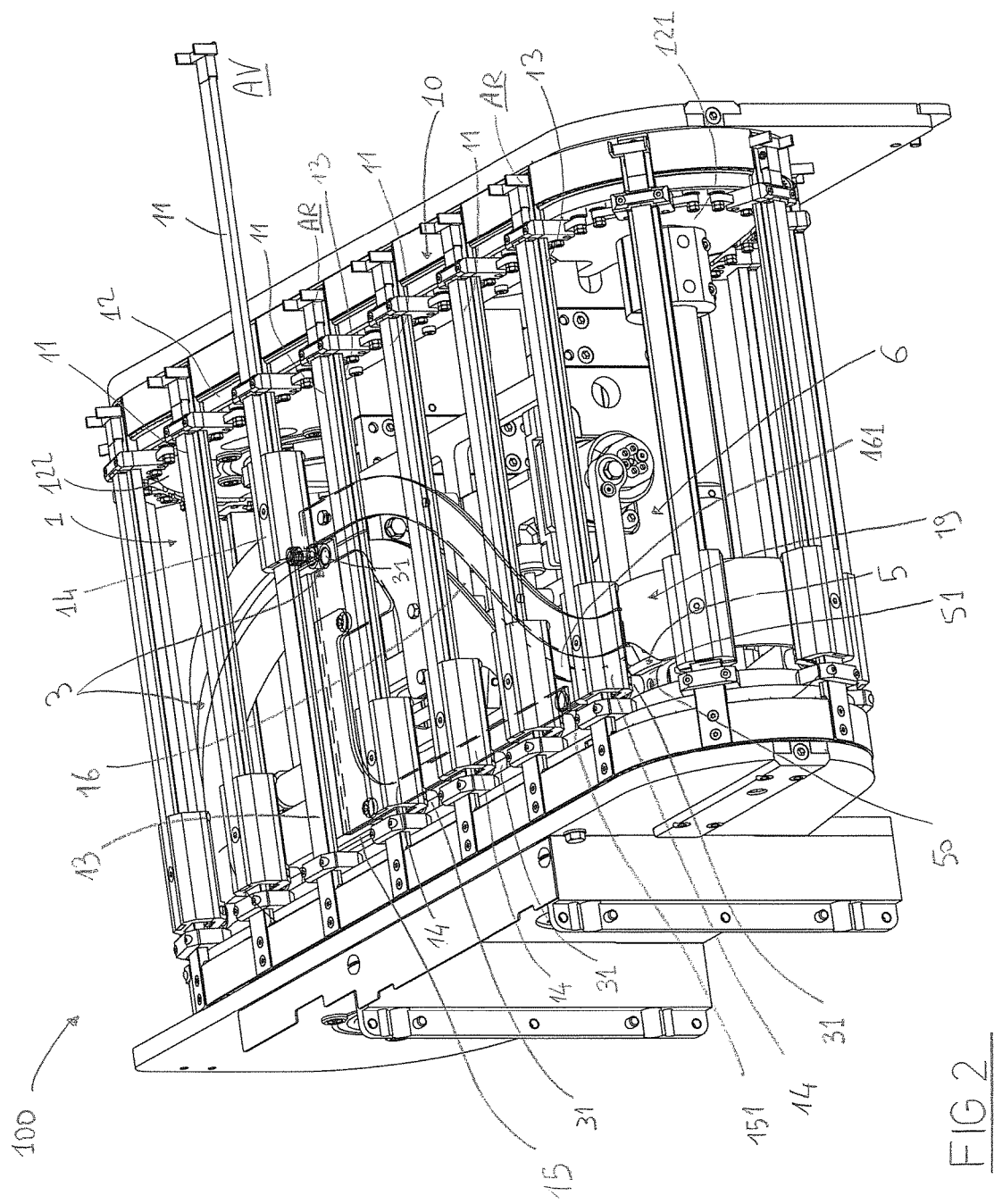
FIG. 2 is a schematic perspective view of the apparatus of the present invention in the configuration of FIG. 1.
Figure 3:
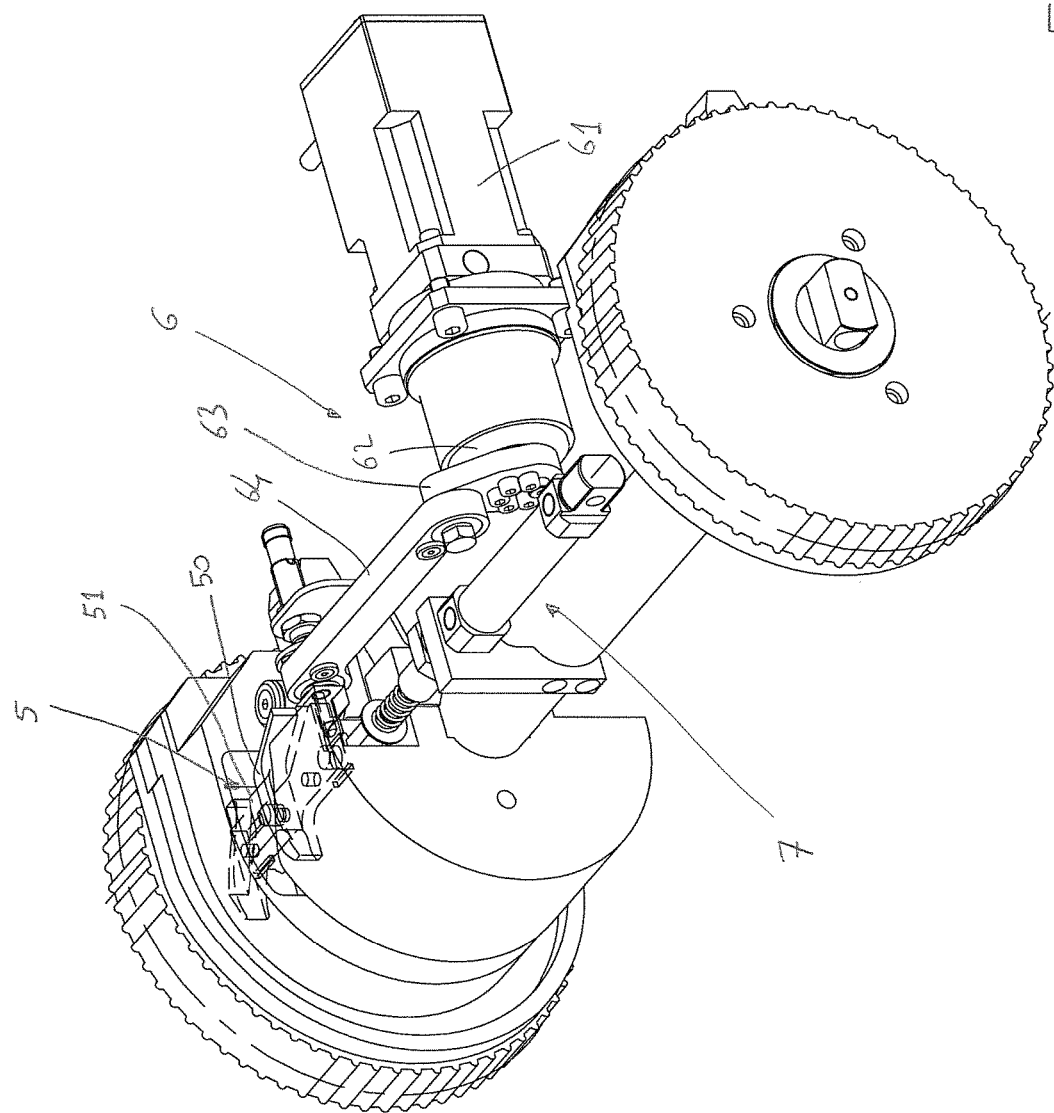
FIG. 3 is a schematic perspective view of the particularly significant components of the apparatus of the present invention.

With reference to the appended figures, reference numeral (100) is used to denote the apparatus for displacing articles continuously advancing along and advancement direction (A), proposed by the present invention, in its entirety.

This apparatus (100) is especially suitable for being used in all those situations in which it is necessary to carry out insertion of articles (not illustrated in the appended figures) internally of relative containers (also not illustrated) when both the articles and the relative containers are continuously advanced along relative conveyors flanked to one another and which advance in synchrony at the same advancement velocity.

In the appended figures, the conveyors of the articles and the boxes are not illustrated as they are not pertinent to the characteristics of the apparatus (100) of the present invention, but reference arrow (A) generally denotes the advancement direction along which the articles are continuously advanced, which articles are to be displaced and transversally pushed in relation to the advancement direction (A) thereof, into relative containers which advance by the flank thereof.

The apparatus (100) of the present invention is particularly and advantageously applied in automatic packaging machines which must carry out the inserting of blister packs internally of relative boxes, when the blister packs, arranged one following another on a relative conveyor, are continuously advanced along an advancement direction (A), while, in turn, the boxes are arranged following one another on a relative conveyor, flanked to the conveyor of the blister packs, and are continuously advanced along an advancement direction parallel to the advancement direction of the blister packs and in synchrony therewith, so that each box is facing a relative blister pack.

In the appended figures, as mentioned in the foregoing, the conveyors of the articles and the boxes are not illustrated, but reference arrow (A) generally denotes the advancement direction along which the blister packs are continuously advanced.

The apparatus (100) comprises a loop-closed conveyor organ (1) constituted by a pair of belts (12) wound on relative activating pulleys (121, 122) according to a winding pathway which comprises at least a straight conveying branch (10), for example the upper branch.

The conveyor organ (1) is arranged in such a way that the straight conveying branch (10) has a conveying direction (W) that is parallel to the advancement direction (A) of the articles and is activated in a continuous way, and in synchrony, with the advancement velocity of the articles along the relative advancement direction (A).

The apparatus (100) further comprises a series of support rods (13) which are transversally fixed to the pair of belts (12) and a series of pusher elements (11) mounted on the support rods (13).

In this regard, the apparatus (100) comprises a series of carriages (14) which are mounted on the support rods (13), to which carriages (14) the pusher elements (11) are fixed and constrained.

In this way the pusher elements (11), when the support rods (13) pass along the straight conveying branch (10), are advanced along an advancement direction (V) parallel to the advancement direction (A) of the articles, and with a velocity corresponding to the advancement velocity of the articles, so that each thereof is opposite a relative article.

The carriages (14) are further mounted and predisposed on the support rods (13) so as to be made slidable along the support rods (13), so that the pusher elements (11) can be moved and translated along the rods (13) and are therefore movable transversally to the advancement direction (V) thereof and transversally to the straight conveying branch (10).

With the aim of being able to activate the translation of the carriages (14) along the relative support rods (13), and thus displace the pusher elements (11) transversally to the advancement direction (V) thereof, when the pusher elements (11) pass along the straight conveying branch (10), the apparatus (100) comprises special movement means (3).

The movement means (3) comprise rollers (31), which are mounted idle below the carriages (14), and sliding guides (15, 16) which have a shape such that the rollers (31) of the carriages (14) can slide internally thereof.

The sliding guides (15, 16) comprise at least a first sliding pathway (15) and a second sliding pathway (16), alternative to one another, for the sliding of the rollers (31) of the carriages (14) which are to move along the straight conveying branch (10).

In particular, the first sliding pathway (15) being arranged with respect to the belts (12) of the conveyor organ (1) so as to have an inlet (151) situated at a start of the straight conveying branch (10) and having a progression and profile such that when the rollers (31) move along the first sliding pathway (15), the carriages (14) are forced to maintain a stationary position on the respective support rods (13) so that the pusher elements (11) are maintained in a retracted position (AR) with respect to the articles advancing along the relative advancement direction (A) (see for example FIG. 1, where the rollers (31) of the carriages (14) of the first four pusher elements (11), starting from the left in the figure, which are passing along the straight conveying branch (10) of the conveyor organ (1), are in a retracted position (AR) and therefore inoperative, i.e. they cannot carry out any displacement and pushing action of the relative articles, not illustrated, which therefore continue to advance undisturbed along the advancement direction (A) thereof).

The second sliding pathway (16) is in turn arranged with respect to the belts (12) of the conveyor organ (1) so as to have an inlet (161) situated at a start of the straight conveying branch (10) and having a progression and profile such that when the rollers (31) of the carriages (14) move along the second sliding pathway (16), the carriages (14) are forced:

first to translate along the respective support rods (13), transversally of the belts (12), so that the pusher elements (11), during advancement thereof along a first portion of the straight conveying branch (10), are forced to translate transversally to the advancement direction (V) thereof and transversally to the straight conveying branch (10) from the retracted position (AR) up to an advanced position (AV), so that they can abut the articles and displace and push the articles transversally in order to insert the articles into the containers (see for example the FIG. 1 where the fifth thrust element (11), starting from the left, has been pushed transversally to the advancement direction (V) thereof along the conveyor, by means of a sliding of the rollers (31) of the relative carriage (14) into the second sliding pathway (16), up to arriving in the advanced position (AV));

and, subsequently, are forced to perform an inverse translation on the respective support rods (13), during advancement thereof along a second portion of the straight conveying branch (10), so that the pusher elements (11) are forced to translate in a contrary direction from the advanced position to the initial retracted position thereof.

The apparatus (100) further comprises a switching device (5), which is predisposed at a curved portion (19) of the conveyor organ (1) for winding the belts (12) about relative activating pulleys (121) which are arranged upstream of the straight conveying branch (10).

The switching device (5) is specially provided and configured for being able to abut the rollers (31) of the carriages (14) which are moving along the curved portion (19) of the conveyor organ (1) and deviating them so that the rollers (31) can be inserted and slide either in the first sliding pathway (15) or in the second sliding pathway (16).

In this way, according to the effective presence or not of articles and containers, the apparatus (100), by means of this switching device (5), can deviate the rollers (31), and therefore the carriages (14), with the relative pusher elements (11), so that they insert and slide either in the first sliding pathway (15) (so as to make the pusher elements (11) non-operative as they are maintained in the retracted position (AR) thereof, in a case where there are no articles and/or boxes) or in the second sliding pathway (16) (the pusher elements (11) are made operative, as they are pushed transversally in the advancement direction thereof towards the advanced position (AV) thereof, in a case where the presence has been detected of both the articles and the relative containers).

The special characteristics of the apparatus (100) of the present invention consist in the fact that the switching device (5) comprises an exchange element (50) comprising a channel (51) having a shape such as to receive a roller (31) and enable sliding of the roller (31) internally thereof.

The exchange element (50) is predisposed at a curved portion for winding (19) the belts (12) about the relative activating pulleys (121) which are arranged upstream of the start of the straight conveying branch (10), and in a position immediately upstream of both the inlet (151) of the first sliding pathway (15) and the inlet (161) of the second sliding pathway (16), at the start of the straight conveying branch (10).

In this way the channel (51) of the exchange element (50) is able to slidingly internally receive the rollers (31) of the carriages (14) which are moving along the curved portion (19) of the conveyor organ (1).

Figure 4:
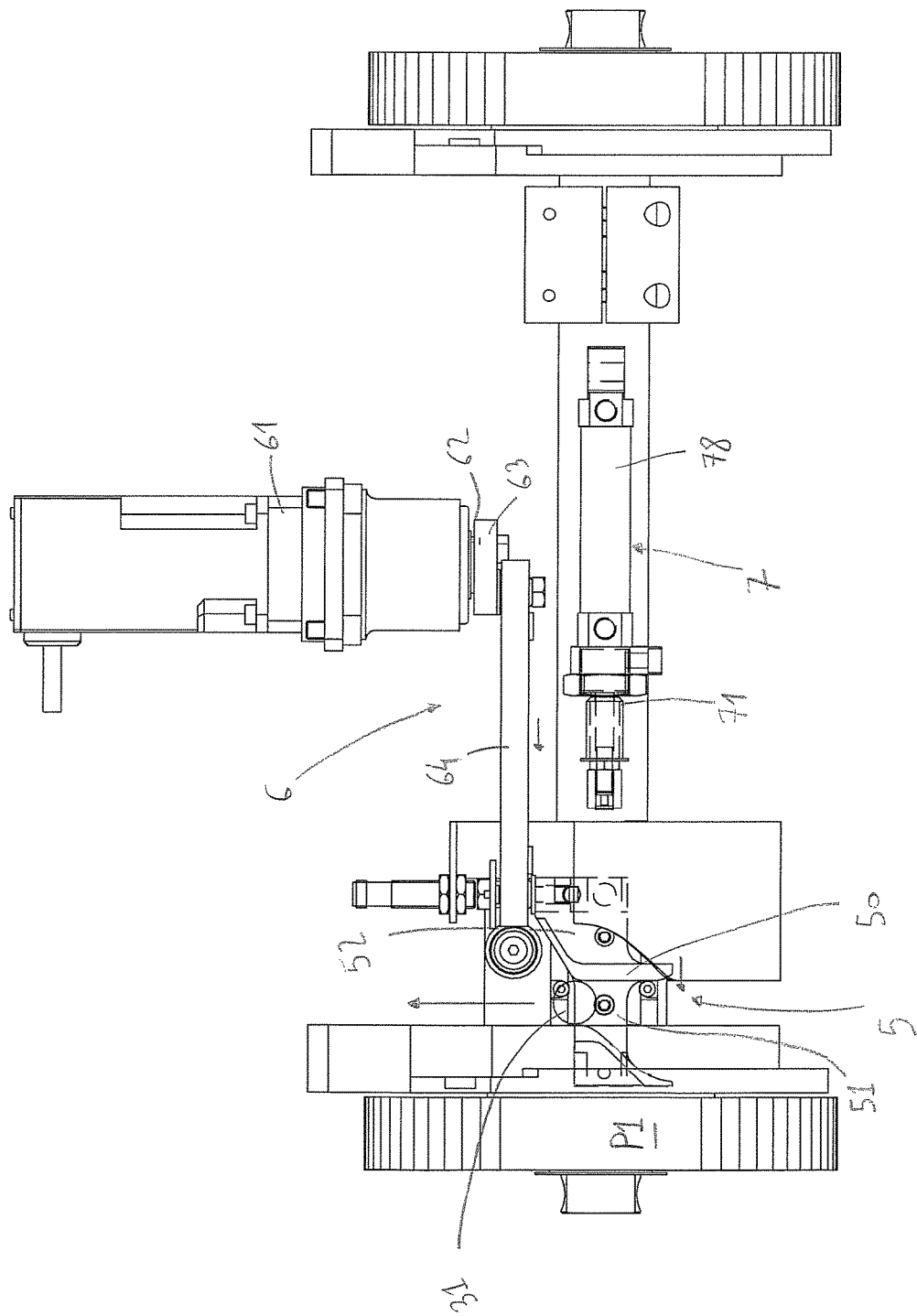
FIG. 4 is a view from above of the components of the apparatus illustrated in FIG. 3, and represented in a relative first possible operating configuration thereof during the functioning of the apparatus.
Figure 5:
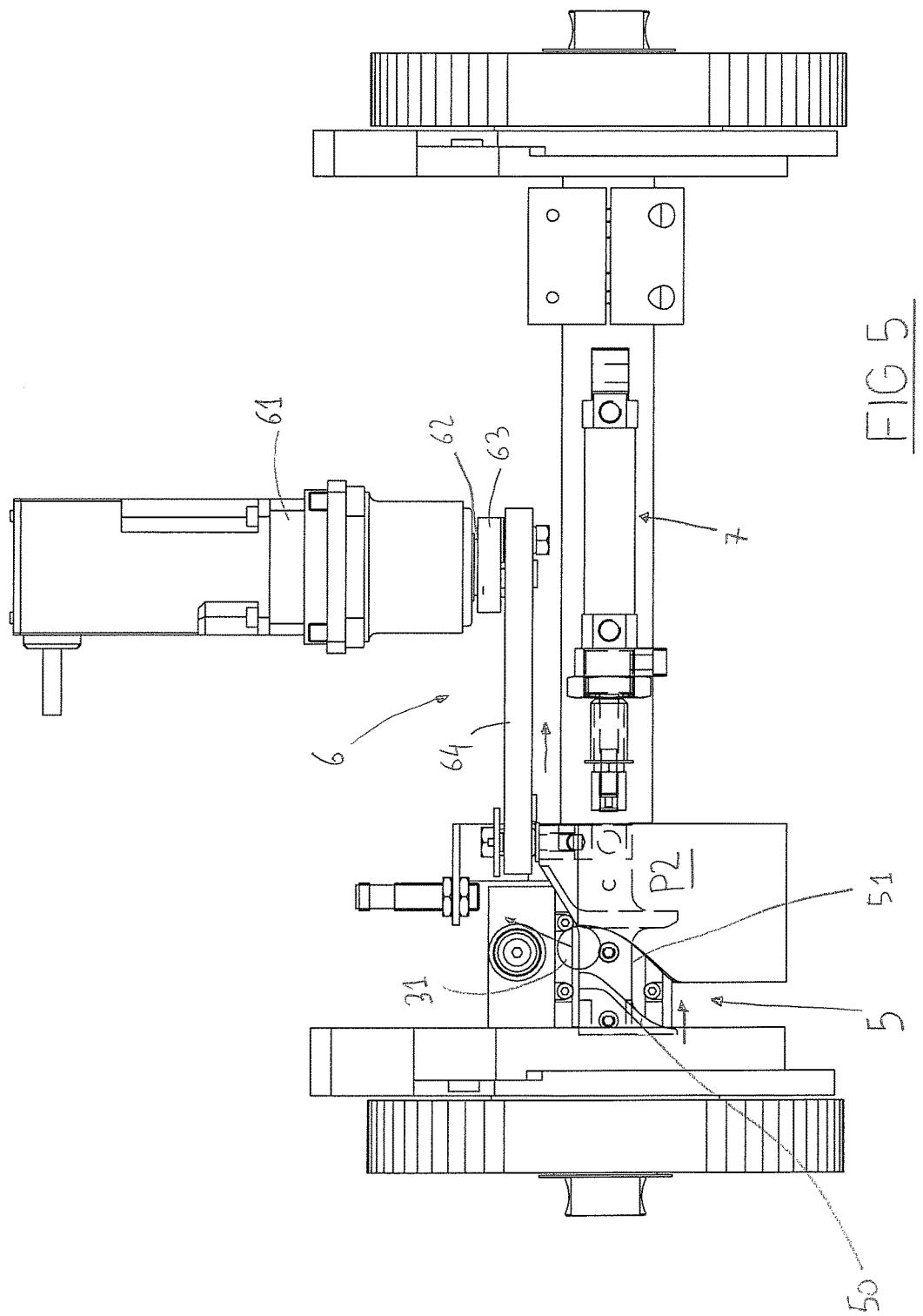
FIG. 5 is a view from above of the components of the apparatus illustrated in FIG. 3, and represented in a relative second possible operating configuration thereof during the functioning of the apparatus.

The switching device (5) also comprises actuator means (6) which are connected to the exchange element (50) and which are predisposed and configured for being activated so as to translate the exchange element (50) transversally to the movement direction of the belts (12) and of the rollers (31) along the curved portion (19), between:

a first position (P1), at which the channel (51) of the exchange element (50) is connected to the inlet (151) of the first sliding pathway (15) so that the roller (31) which is sliding along the channel (51) can insert, and therefore slide, in the first sliding pathway (15) (see for example FIG. 4), and a second position (P2), at which the channel (51) of the exchange element (50) is connected to the inlet (161) of the second sliding pathway (16) so that the roller (31) which is sliding along the channel (51) can insert, and therefore slide, in the second sliding pathway (16) (see for example FIG. 5).

The activation of the actuator means (6) can be determined by sensor organs (not illustrated) specially positioned so as to detect a presence of the articles on the relative conveyor belt and the corresponding containers on the respective conveyor belt.

Normally the default position is when the actuator means (6) are configured so as to maintain the exchange element (50) in the first position (P1) thereof with the channel (51) connected to the inlet (151) of the first sliding channel (15).

In this way, in a case in which the sensor organs detect a non-presence of an article and/or of the relative container, the actuator means (6) remain inoperative, as the pusher element (11) which was predisposed to perform the displacement operation of the article must remain in the retracted position (AR) thereof along the straight conveying branch (10) of the conveyor organ (1), and therefore the roller (31) of the relative carriage (14) follows the first sliding pathway (15).

This situation remains unvaried up to when the sensor organs detect the presence of both the article and the relative advancing container on the two conveyors located flanked to the conveyor organ (1).

In this case, the actuator means (6), as soon as the roller (31) of the carriage (14) bearing the pusher element (11) destined to carry out the transversal displacement of the article so as to insert it in the relative container has entered the channel (51) of the exchange element (50), are activated so as to translate the exchange element (50) into the second position (P2) so as to connect it with the inlet (161) of the second sliding pathway (16), so that the roller (13) can insert and follow the second sliding pathway (16), and therefore translate the carriage (14) along the support rod (13) transversally to the conveyor organ (1), so that the relative pusher element (11) is translated into the advanced position (AV) thereof in order to be able to abut the article and push it into the relative container.

If the sensor organs also detect the presence of both an article and the relative container following the preceding ones, then the actuator means (6) are not activated, as the exchange element (50) is already positioned in the second connecting position (P2) of the relative channel (51) with the inlet (161) of the second sliding pathway (16).

As soon as the sensor organs detect a new non-presence of an article and/or the relative container, the actuator means (6) are activated for displacing the exchange element (50) into the first position (P1) so as to connect the relative channel (51) with the inlet (151) of the first sliding pathway (15) so that the roller (31) of the carriage (14) that bears the corresponding pusher element (11) (i.e. the one that must be maintained in the retracted position (AR)) can be directed into the first sliding pathway (15).

It is clear that these exchange procedures of the pathway of the rollers for directing the rollers either to the first sliding pathway or to the inlet of the second sliding pathway are much simpler and more immediate, so as to guarantee even high exchanging frequencies in accordance with the effective advancement velocity of the articles and the containers along the relative conveyors, and therefore also at the effective velocity with which the belts of the conveyor organ have to be activated.

Other advantageous characteristics of the apparatus (100) of the present invention are described in the following.

In the preferred but not exclusive embodiment illustrated in the appended figures, the actuator means (6) comprise a motor (61) (for example a brushless motor), and a shaft (62) activatable in rotation, in opposite rotation directions, by the motor (61), the shaft (62) being kinematically connected to the exchange element (50).

For example, the actuator means (6) can comprise a crank element (63) which is mounted on the shaft (62) and a connecting rod element (64) constrained, at a first end thereof, to the crank element (63) and connected, at a second end thereof, to the exchange element (50).

In this case for example, when the motor (61) activates the shaft (62) in a first rotation direction, the conrod element (64) is translated, by means of the rotation of the crank element (63), in a first direction for pushing the exchange element (50) into the first connecting position (P1) of the channel (51) with the inlet (151) of the first sliding pathway (15), while, on the other hand, when the motor (61) activates the shaft (62) in a second rotation direction, opposite the first, the conrod element (64) is translated, by means of the rotation of the crank element (63), in a second direction, opposite the first direction, for pushing the exchange element (50) into the second connecting position (P2) of the channel (51) with the inlet (161) of the second sliding pathway (16).

In a particularly advantageous aspect, the apparatus (100) also comprises a safety device (7), activatable in a case where the apparatus halts or where the exchange element (5) halts (for example due to a machine block or in a case of unexpected electrical power failure) and which is predisposed so as to abut the exchange element (50) and push and maintain the exchange element (50) in the first position (P1), in which the relative channel (51) is connected with the inlet (151) of the first sliding pathway (15).

In this way, in a case where the operator operates the apparatus by hand, i.e. activated the pulleys manually to move the belts, the rollers of the various carriages will all be directed into the first sliding pathway, and therefore the pusher elements will be maintained in the retracted position (AR) thereof so as not to carry out any operation on the articles located flanked thereto.

Figure 6:
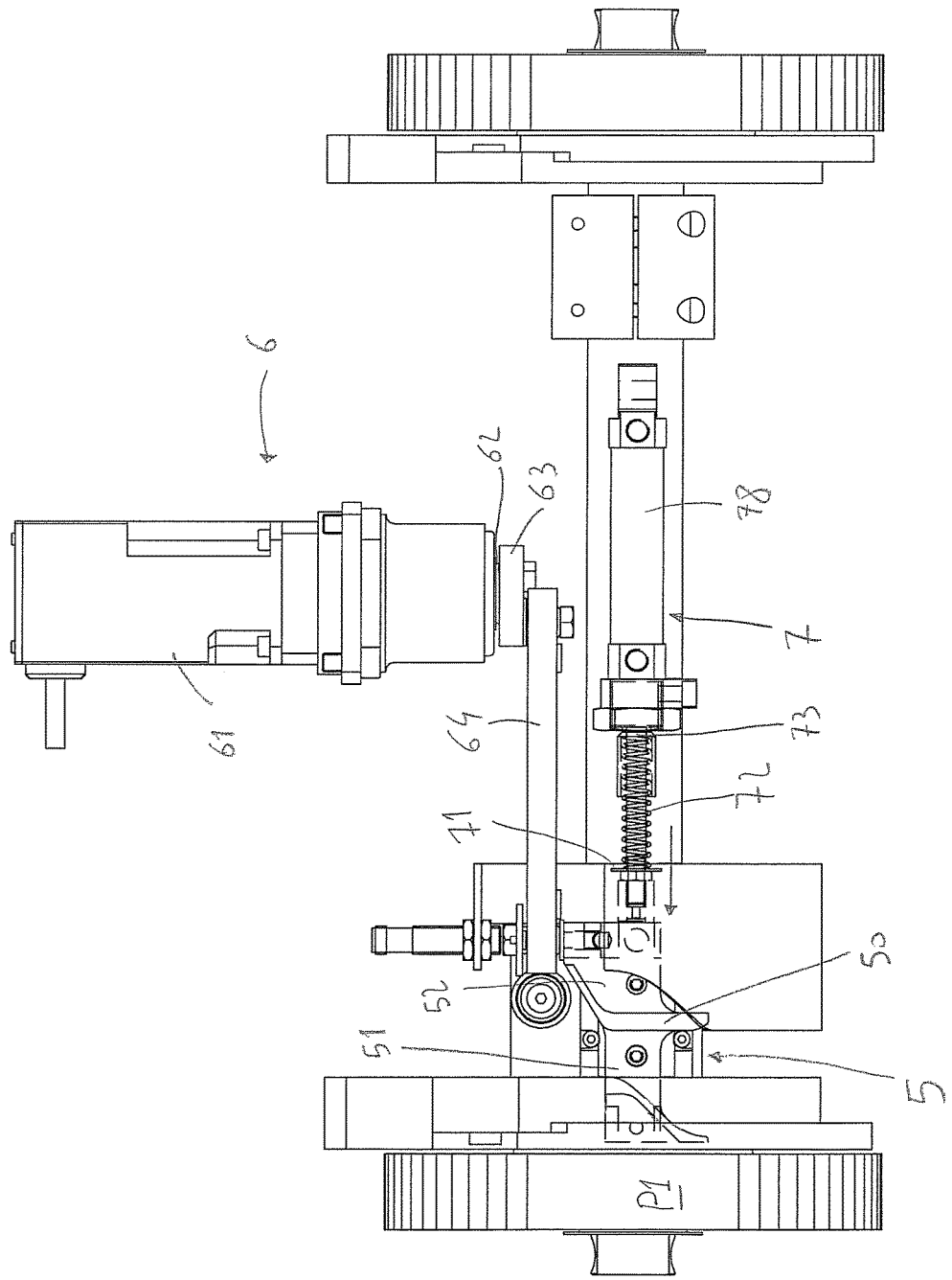
FIG. 6 is a view from above of further other significant components of the apparatus represented in the configuration that they can assume in a case of a halt in the functioning of the apparatus.

In the preferred embodiment illustrated in the figures, the safety device (7) comprises (see in particular FIG. 6): a pneumatic piston (71) mounted internally of a cylinder (78), and having a stem (73) on which a spring (72) is mounted; the cylinder (78) is connected to a compressed air source so that when the compressed air source is active the pneumatic piston (71) is pushed into the cylinder (78) and compresses the spring (72), and the pneumatic piston (71) thus remains distant from the exchange element (50).

In the case of a machine block or a failure of electrical power, the pneumatic source supply is interrupted and consequently the pneumatic piston (71) is no longer subject to the thrust action of the compressed air and the spring (72) can expand elastically so as to displace and push the piston (71) up to bringing it into abutment against the exchange element (50) for pushing and maintaining the exchange element (50) into and in the above-mentioned first position (P1).

Lastly, the apparatus (100) comprises a support plate (52) on which the exchange element (50) is mounted, and a sliding guide (not visible in detail in the appended figures) on which the support plate (52) is predisposed, so as to guide the translation of the exchange element (5) when it is displaced and made to translate between the first position (P1) and the second position (P2).

The first sliding pathway (15) and the second sliding pathway (16) have an extension and a profile such as to have the relative outlets flanked to one another at the end of the straight conveying branch (10), while the above-mentioned movement means (3) also comprise a third sliding pathway for the rollers (31) (not illustrated in detail in the appended figures) which has an inlet positioned at both the outlet of the first sliding pathway (15) and at the outlet of the second sliding pathway (16), at the end of the straight conveying branch (10), and which extends along the opposite branch of the conveyor organ (1), parallel to the first sliding pathway (15), up to the curved portion (19) in which the exchange element (50) is positioned, so as to guide the rollers (31) of the carriages (14) and maintain the pusher elements (11) in the retracted and therefore non-operating position (AR).

The invention claimed is:

1. An apparatus for displacing articles advancing continuously along an advancement direction, the articles having to be displaced and pushed transversally, while they are made to advance continuously along the advancement direction, internally of relative containers which in turn are made to advance continuously, flanked to and in synchrony with the advancement of the articles, comprising:
   a loop-closed conveyor organ comprising a pair of belts wound on relative activating pulleys according to a winding pathway which comprises at least a straight conveying branch, the conveyor organ being arranged in such a way that the straight conveying branch has a conveying direction that is parallel to the advancement direction of the articles and is activated in a continuous way, and in synchrony, with an advancement velocity of the articles along the relative advancement direction, a series of support rods which are transversally fixed to the pair of belts of the conveyor organ;
   a series of pusher elements for transversally displacing and pushing the articles which are advancing along the relative advancement direction, the pusher elements being borne by relative carriages that are mounted on the support rods so that the pusher elements, when the support rods are moved along the straight conveying branch, advance along an advancement direction and with a velocity corresponding to the advancement velocity of the articles along the relative advancement direction so that each of the pusher elements is opposite a relative article advancing along the relative advancement direction, the carriages being mounted on the support rods slidably so that the pusher elements can be movable along the support rods and transversally to the advancement direction thereof and transversally to the straight conveying branch, movement means that are associated to the conveyor organ and comprise: a series of rollers, each mounted idle below a carriage of the carriages, and sliding guides having a shape such that the rollers of the carriages can slide internally thereof;
   the sliding guides comprising at least a first sliding pathway and a second sliding pathway, alternative to one another, for the sliding of the rollers of the carriages which are to move along the straight conveying branch, the first sliding pathway being arranged with respect to the belts of the conveyor organ so as to have an inlet situated at a start of the straight conveying branch and having a progression and profile such that when the rollers move along the first sliding pathway, the carriages are forced to maintain a stationary position on the respective support rods so that the pusher elements are maintained in a retracted position with respect to the articles advancing along the relative advancement direction, the second sliding pathway being arranged with respect to the belts of the conveyor organ so as to have an inlet situated at a start of the straight conveying branch and having a progression and profile such that when the rollers of the carriages move along the second sliding pathway, the carriages are forced first to translate along the respective support rods, transversally of the belts, so that the pusher elements, during advancement thereof along a first portion of the straight conveying branch, are forced to translate transversally to the advancement direction thereof and transversally to the straight conveying branch from the retracted position up to an advanced position, so that they can abut the articles and displace and push the articles transversally in order to insert the articles into the containers and, subsequently, are forced to perform an inverse translation on the respective support rods, during advancement thereof along a second portion of the straight conveying branch, so that the pusher elements are forced to translate in a contrary direction from the advanced position to the initial retracted position thereof, a switching device, for deviating the rollers of the carriages so that the rollers can be inserted and slide either in the first sliding pathway or in the second sliding pathway, the switching device comprising: an exchange element comprising a channel having a shape such as to receive a roller and enable sliding of the roller internally thereof, the exchange element being predisposed at a curved portion for winding belts about the relative activating pulleys which are arranged upstream of the start of the straight conveying branch, and in a position immediately upstream of both the inlet of the first sliding pathway and the inlet of the second sliding pathway, at the start of the straight conveying branch, in such a way as to be able to receive, in the relative channel, the rollers of the carriages which are moving along the curved portion of the conveyor organ;
   actuator means which are connected to the exchange element and which are activatable so as to translate the exchange element transversally to the movement direction of the belts and of the rollers along the curved portion, between a first position, at which the channel of the exchange element is connected to the inlet of the first sliding pathway so that the roller which is sliding along the channel can insert, and therefore slide, in the first sliding pathway, and a second position, at which the channel of the exchange element is connected to the inlet of the second sliding pathway so that the roller which is sliding along the channel can insert, and therefore slide, in the second sliding pathway, wherein:
the actuator means comprise a motor and a shaft activatable in rotation, in opposite rotation directions, by the motor, the shaft being kinematically connected to the exchange element, and
the actuator means comprise a crank element which is mounted on the shaft and a connecting rod element constrained, at a first end thereof, to the crank element and connected, at a second end thereof, to the exchange element.

2. The apparatus of claim 1, further comprising a support plate on which the exchange element is mounted, and a sliding guide on which the support plate is predisposed, so as to guide the translation of the exchange element when it is displaced and made to translate between the first position and the second position.

3. An apparatus for displacing articles advancing continuously along an advancement direction, the articles having to be displaced and pushed transversally, while they are made to advance continuously along the advancement direction, internally of relative containers which in turn are made to advance continuously, flanked to and in synchrony with the advancement of the articles, comprising: a loop-closed conveyor organ comprising a pair of belts wound on relative activating pulleys according to a winding pathway which comprises at least a straight conveying branch, the conveyor organ being arranged in such a way that the straight conveying branch has a conveying direction that is parallel to the advancement direction of the articles and is activated in a continuous way, and in synchrony, with an advancement velocity of the articles along the relative advancement direction, a series of support rods which are transversally fixed to the pair of belts of the conveyor organ;

a series of pusher elements for transversally displacing and pushing the articles which are advancing along the relative advancement direction, the pusher elements being borne by relative carriages that are mounted on the support rods so that the pusher elements, when the support rods are moved along the straight conveying branch, advance along an advancement direction and with a velocity corresponding to the advancement velocity of the articles along the relative advancement direction so that each of the pusher elements is opposite a relative article advancing along the relative advancement direction, the carriages being mounted on the support rods slidably so that the pusher elements can be movable along the support rods and transversally to the advancement direction thereof and transversally to the straight conveying branch, movement means that are associated to the conveyor organ and comprise: a series of rollers, each mounted idle below a carriage of the carriages, and sliding guides having a shape such that the rollers of the carriages can slide internally thereof;

the sliding guides comprising at least a first sliding pathway and a second sliding pathway, alternative to one another, for the sliding of the rollers of the carriages which are to move along the straight conveying branch, the first sliding pathway being arranged with respect to the belts of the conveyor organ so as to have an inlet situated at a start of the straight conveying branch and having a progression and profile such that when the rollers move along the first sliding pathway, the carriages are forced to maintain a stationary position on the respective support rods so that the pusher elements are maintained in a retracted position with respect to the articles advancing along the relative advancement direction, the second sliding pathway being arranged with respect to the belts of the conveyor organ so as to have an inlet situated at a start of the straight conveying branch and having a progression and profile such that when the rollers of the carriages move along the second sliding pathway, the carriages are forced first to translate along the respective support rods, transversally of the belts, so that the pusher elements, during advancement thereof along a first portion of the straight conveying branch, are forced to translate transversally to the advancement direction thereof and transversally to the straight conveying branch from the retracted position up to an advanced position, so that they can abut the articles and displace and push the articles transversally in order to insert the articles into the containers and, subsequently, are forced to perform an inverse translation on the respective support rods, during advancement thereof along a second portion of the straight conveying branch, so that the pusher elements are forced to translate in a contrary direction from the advanced position to the initial retracted position thereof, a switching device, for deviating the rollers of the carriages so that the rollers can be inserted and slide either in the first sliding pathway or in the second sliding pathway, the switching device comprising: an exchange element comprising a channel having a shape such as to receive a roller and enable sliding of the roller internally thereof, the exchange element being predisposed at a curved portion for winding belts about the relative activating pulleys which are arranged upstream of the start of the straight conveying branch, and in a position immediately upstream of both the inlet of the first sliding pathway and the inlet of the second sliding pathway, at the start of the straight conveying branch, in such a way as to be able to receive, in the relative channel, the rollers of the carriages which are moving along the curved portion of the conveyor organ; actuator means which are connected to the exchange element and which are activatable so as to translate the exchange element transversally to the movement direction of the belts and of the rollers along the curved portion, between a first position, at which the channel of the exchange element is connected to the inlet of the first sliding pathway so that the roller which is sliding along the channel can insert, and therefore slide, in the first sliding pathway, and a second position, at which the channel of the exchange element is connected to the inlet of the second sliding pathway so that the roller which is sliding along the channel can insert, and therefore slide, in the second sliding pathway, further comprising a safety device, activatable in a case where the apparatus halts or the exchange element halts, and predisposed so as to abut the exchange element and push and maintain the exchange element in the first position, wherein the relative channel is connected to the inlet of the first sliding pathway.

4. The apparatus of claim 3, wherein the safety device comprises:

a pneumatic piston mounted internally of a cylinder, and having a stern on which a spring is mounted, the cylinder being connected to a compressed air source so that when the compressed air-source is active the pneumatic piston compresses the spring, the spring being destined to expand elastically during a lack of supply of the source of compressed air so as to displace and push the piston up to bringing it into abutment against the exchange element for pushing and maintaining the exchange element into and in the above-mentioned first position.

* * * * *